(12) United States Patent
Schrader

(10) Patent No.: US 8,913,324 B2
(45) Date of Patent: Dec. 16, 2014

(54) DISPLAY ILLUMINATION LIGHT GUIDE

(75) Inventor: Martin Schrader, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/568,599

(22) Filed: Aug. 7, 2012

(65) Prior Publication Data

US 2014/0043688 A1 Feb. 13, 2014

(51) Int. Cl.
*G02B 27/14* (2006.01)

(52) U.S. Cl.
USPC .......................................... 359/630

(58) Field of Classification Search
USPC .......................................... 359/630
See application file for complete search history.

(56) References Cited

U.S. PATENT DOCUMENTS

| | | | |
|---|---|---|---|
| 6,490,104 B1 | 12/2002 | Gleckman et al. | 359/819 |
| 7,764,413 B2 | 7/2010 | Levola | 359/15 |
| 8,031,406 B2 | 10/2011 | Chen | 359/630 |
| 2002/0191297 A1 | 12/2002 | Gleckman et al. | 359/629 |
| 2003/0030596 A1 | 2/2003 | Park | 345/8 |
| 2003/0210467 A1* | 11/2003 | Song | 359/630 |
| 2004/0085649 A1 | 5/2004 | Repetto et al. | 359/633 |
| 2009/0303212 A1* | 12/2009 | Akutsu et al. | 345/204 |
| 2010/0008070 A1 | 1/2010 | Lee | 362/97.2 |
| 2011/0164431 A1* | 7/2011 | Anandan | 362/606 |

OTHER PUBLICATIONS

Pekka Äyräs and Pasi Saarikko; "Near-to-eye display based on retinal scanning and a diffractive exit-pupil expander;" *Optics, Photonics, and Digital Technologies for Multimedia Applications*. Edited by Schelkens, Peter; Ebrahimi, Touradj; Cristóbal, Gabriel; Truchetet, Frédéric; Saarikko, Pasi. *Proceedings of the SPIE*, vol. 7723, pp. 77230V-77230V-8 (2010). Apr. 2010 (Abstract—2 pages).

* cited by examiner

*Primary Examiner* — James Jones
(74) *Attorney, Agent, or Firm* — Harrington & Smith

(57) ABSTRACT

A near-eye display device has a multi-color light source, a micro display, an optical system and a light guide. The optical system collimates and redirects light from the micro display to an optical axis of the device. The light guide comprises multiple color-specific layers, an in-coupling diffraction grating through which light from the source enters the light guide, and an out-coupling diffraction grating through which light from the light guide exits towards the micro display. Two distinct embodiments are detailed: each different color-specific layer of the light guide is defined by a different refractive index; or by a different color-specific filter. In one example there is one in-coupling diffraction grating through which all light from the source enters the light guide; in another there are at least first and second in-coupling diffraction gratings on opposed light guide surfaces through which different colors enter the light guide.

20 Claims, 10 Drawing Sheets

DISPLAY ILLUMINATION LIGHT GUIDE

TECHNICAL FIELD

This invention relates generally to display devices for displaying graphical information to a user, and more particularly relates to micro displays and related electronics/optical engine components such as may be disposed in eyeglasses or other head-mountable near-eye display apparatus.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Recently there has been an increasing amount of research into the field of near-eye displays. Generally these includes some micro display such as a liquid crystal panel onto which data is displayed, and a separate illumination source for adding brightness and preferably color to the information on the micro display. The overall near-eye device then has various arrangements of lenses, mirrors, and the like to optically impose the brightened image from the micro display into a user's optical field of view. Such liquid crystal micro displays can be transmissive or reflective. Being near-eye display devices, weight, power consumption and spatial compactness are some driving design considerations. Of these, spatial compactness has generally been the more difficult engineering obstacle to overcome without adversely impacting quality of the image seen by the user, because it is quite difficult to maintain optical quality through the optical engine which is subject to such severe mechanical/size constraints.

One technical near-eye display solution is detailed at U.S. Pat. No. 6,490,104 entitled "Illumination System for Micro-Display" by Philip Landon Gleckman. As detailed at FIG. 1 of that patent, three light emitting diodes 13 mounted at a lower end of the overall device provide illumination to the micro display 11 after reflection by a polarizing beam splitter 23. The illuminated data is then reflected back from the micro display 11 on a single axis through the beam splitter 23 and an imaging lens 25 toward a viewer 31.

Other relevant teachings in the field of near-eye display devices include US Patent Publication No. 2003/0210467 by Young-Ran Song entitled "Wearable Color Display System"; and US Patent Publication No. 2004/0085649 by Piermario Repetto et al. entitled "Light Guide for display Devices of the Head-Mounted or Head-Up Type". Other relevant teachings include US Patent Publication No. 2010/0008070 by Wai Hon Lee entitled "Back Light Module with Diffractive Couplers".

SUMMARY

In a first exemplary aspect of the invention there is an apparatus comprising: a multi-color light source; a micro display; an optical system for collimating and redirecting light from the micro display with respect to an optical axis defined by a near-eye display device; and a light guide comprising multiple color-specific layers, an in-coupling diffraction grating through which light from the multi-color light source enters the light guide and an out-coupling diffraction grating through which light from the light guide exits towards the micro display.

In a second exemplary aspect of the invention there is method comprising: providing a multi-color light source, a micro display, and an optical system for collimating and redirecting light from the micro display with respect to an optical axis defined by a near-eye display device; and illuminating the micro display with the multi-color light source via a light guide which comprises multiple color-specific layers, an in-coupling diffraction grating through which light from the multi-color light source enters the light guide and an out-coupling diffraction grating through which light from the light guide exits towards the micro display.

DETAILED DESCRIPTION

Figure 1A:
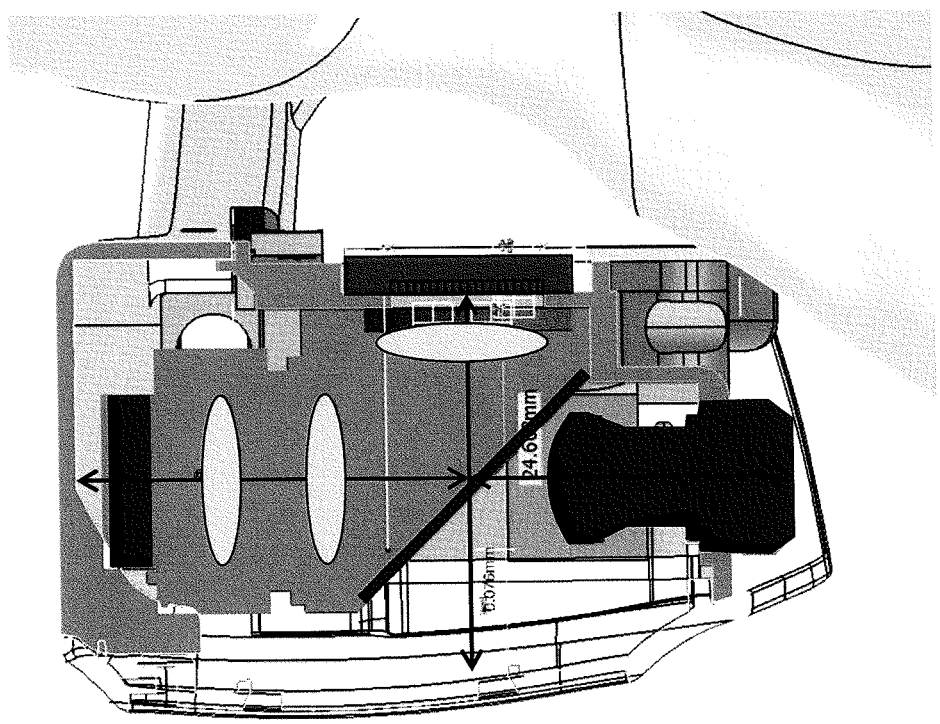
FIGS. 1A-B is a schematic diagram of an optical engine disposed within a near-eye display device, having an exit pupil expander developed by the assignee of this application and with the illumination source mounted low near the user's nose.
Figure 1B:
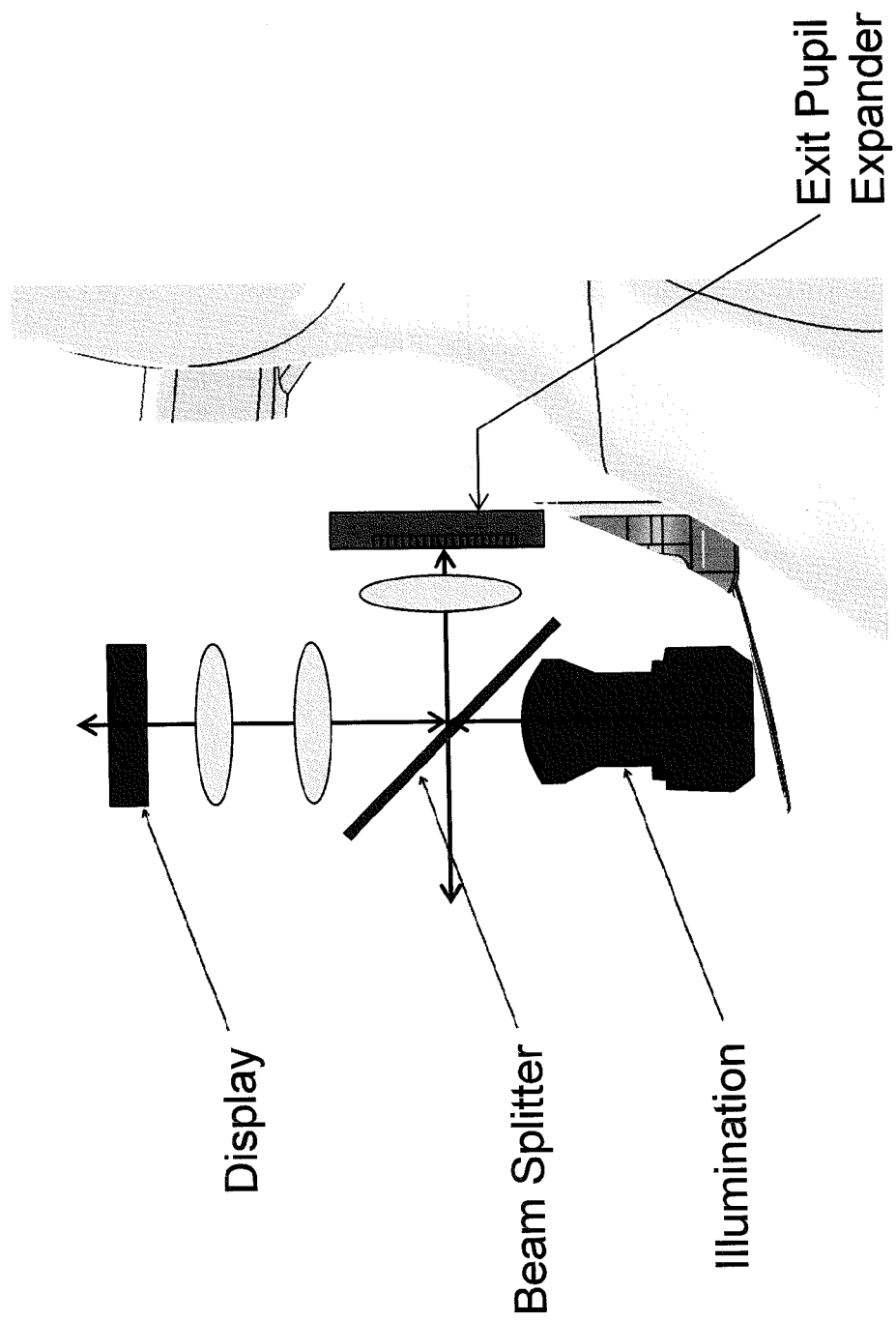

The optical arrangement disclosed at U.S. Pat. No. 6,490,104 is adapted as shown at FIGS. 1A-B herein for better suitability for a head wearable device. FIG. 1A illustrates the relevant optical engine components within a shadow outline of the overall eyeglass-type near-eye display device and FIG. 1B illustrates those same optical engine components in isolation. The FIG. 1A-B adaptation differs from the arrangement disclosed at U.S. Pat. No. 6,490,104 in that the reflection at the beam splitter occurs in FIGS. 1A-B when the illuminated display is re-directed toward the viewer (who is at the rightmost edge of those drawings and looking leftward), and also the optical path between the illumination source and the micro display is straight.

FIG. 1A-B differs additionally in that these drawings incorporate an exit pupil expander between the user's eye and the imaging lens. The exit pupil expander is a technology developed by Nokia Corporation, which is also the assignee of the patent rights herein. See U.S. Pat. No. 7,764,413 by Tapani Lenova entitled GENERAL DIFFRACTIVE OPTICS METHOD FOR EXPANDING AN EXIT PUPIL. The exit pupil extender described there has an input optical element and two exit optical elements disposed on different sides of the input optical element. The exit pupil extender also comprises two intermediate diffractive optical couplers, each disposed between the input optical element and one exit optical element. The couplers serve as exit pupil extending components. The grating lines of the couplers are at substantially a 60-degree angle from that of the optical elements in order to optimize the exit pupil extending efficiency. The system can support a broad range of rotations angles (e.g., between zero and 70°) and corresponding conical angles while remaining geometrically accurate.

Mounting the illumination source low as in FIGS. 1A-B, near the user's nose, supports a lower center of gravity which typically results in a better weight distribution for the overall device. But properly aligning the optical axis of the illumination source with the display becomes difficult from a mechanical perspective when the illumination source is mounted so close to the user's nose as in FIGS. 1A-B, since a single design should ideally function correctly despite a wide variety in the dimensions of user's faces. To avoid those mechanical issues where the illumination source is mounted closely to the user's node, some near-eye micro display devices dispose the illumination source high, above the user's line of sight as shown at FIGS. 2A-B.

Figure 2A:
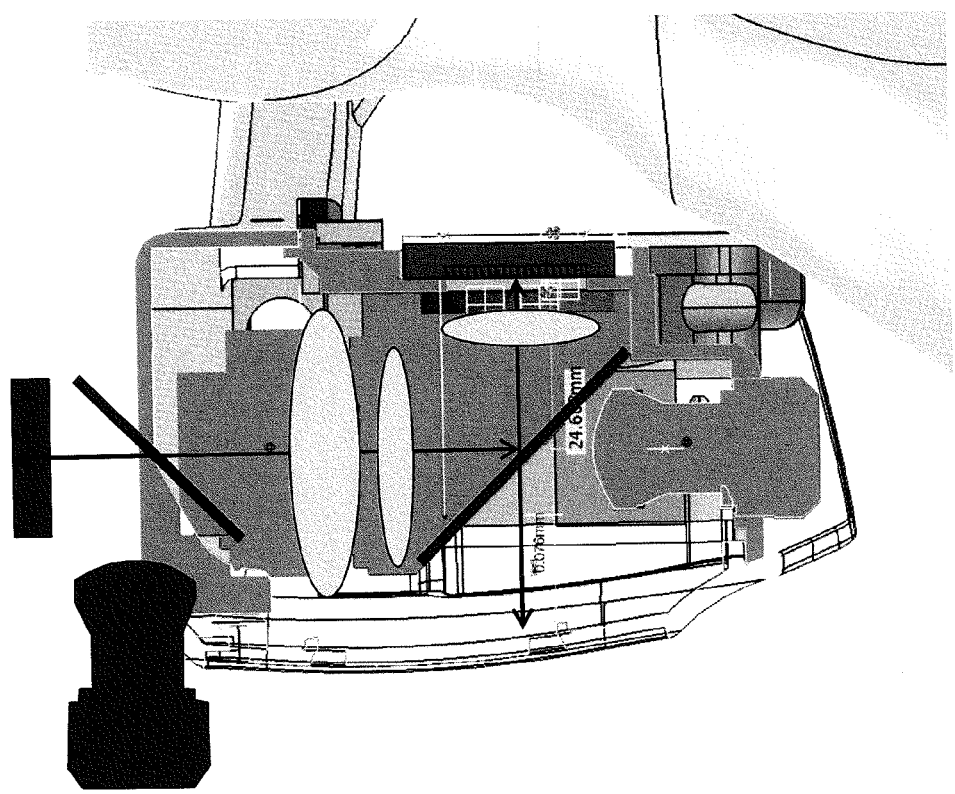
FIGS. 2A-B is an adaptation of the FIG. 1A-B device with the illumination source moved away from the user's nose but necessitating a larger optical path and larger lens as compared to FIGS. 1A-B.
Figure 2B:
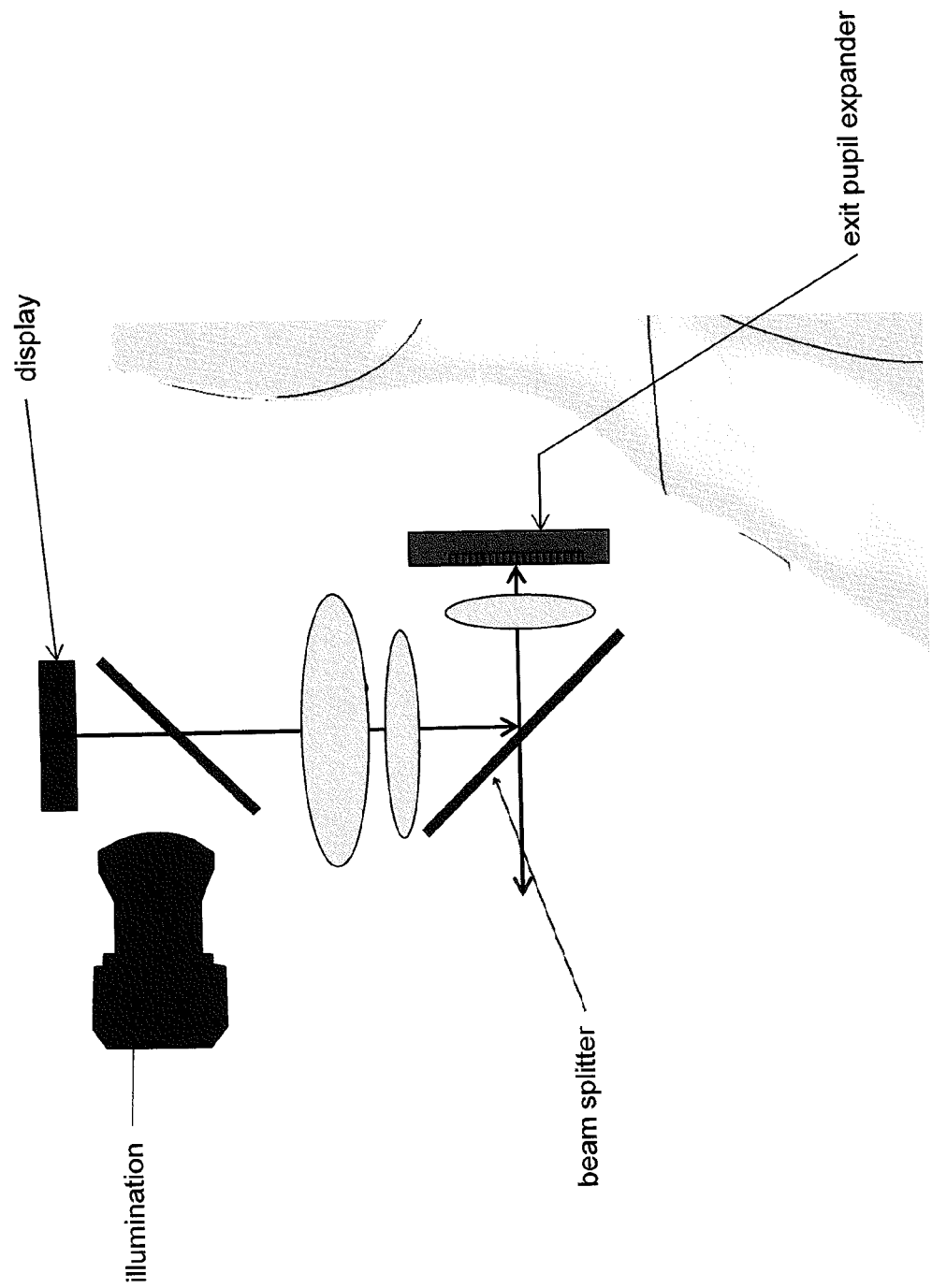

FIGS. 2A-B are similar to FIGS. 1A-B but with a different arrangement of the optical engine components to support the different location of the illumination source. The illumination source and micro display are expanded beyond the physical confines of the overall near-eye device for illustration purposes. Also, the location of the illumination source from FIGS. 1A-B is shown in shadow at FIG. 2A for comparison. Like the arrangement of U.S. Pat. No. 6,490,104, light from the illumination source in FIGS. 2A-B is reflected at a (first) beam splitter toward the display, and reflected back through that same beam splitter without reflection. After passing through a first lens arrangement the optical path is redirected again in FIG. 2A-B by a second beam splitter, this time toward the user's eye through an imaging lens and exit pupil expander. This second beam splitter defines optical pathways similar to those shown at FIGS. 1A-B. The user is able to simultaneously perceive the far field by viewing the straight line optical path through that second beam splitter.

The arrangement of FIG. 2A-B necessitates expanding the distance between the micro display and the first optical element of the first lens system that lies between the two beam splitters, which leads to a requirement for a much larger lens diameter, as is shown if one compares lens sizes between FIGS. 1B and 2B. This also causes the FIG. 2B arrangement to exhibit a performance loss and degraded image quality as compared to the performance/image quality of FIG. 1B.

It is seen to be fairly common to illuminate the micro display in near-eye display devices using beam splitters, as shown by example at FIGS. 1A-B and 2A-B. Embodiments of these teachings take a different approach and instead utilize a waveguide particularly adapted for this purpose as will be detailed below. Waveguide has a certain connotation and so the term light guide is used herein as a more generic alternative. As an overview, such an example light guide embodies diffractive in-coupling and out-coupling gratings to bring the light towards the display without obstructing the optical path of the imaging optics. Importantly, the added optical path required for the light guide is substantially smaller than in case of using a beamsplitter as in FIGS. 2A-B. The diffractive in-coupling enables large internal angles in the light guide which in turn enables quite a thin structure as will be detailed below. A layered structure of the light guide enables a full color system with a reduced system footprint.

Figure 3A:
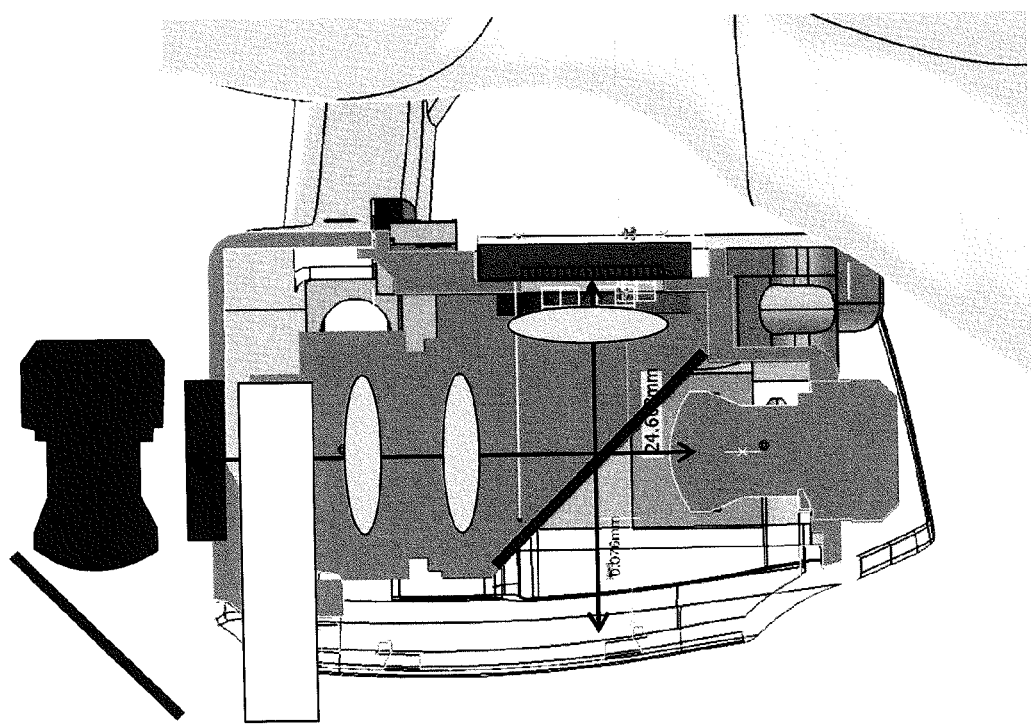
FIGS. 3A-B is a schematic diagram of an optical engine disposed within a near-eye display device with the light source moved above the micro display and light from that source coupled into the micro display by a multi layered light guide according to an exemplary embodiment of these teachings.
Figure 3B:
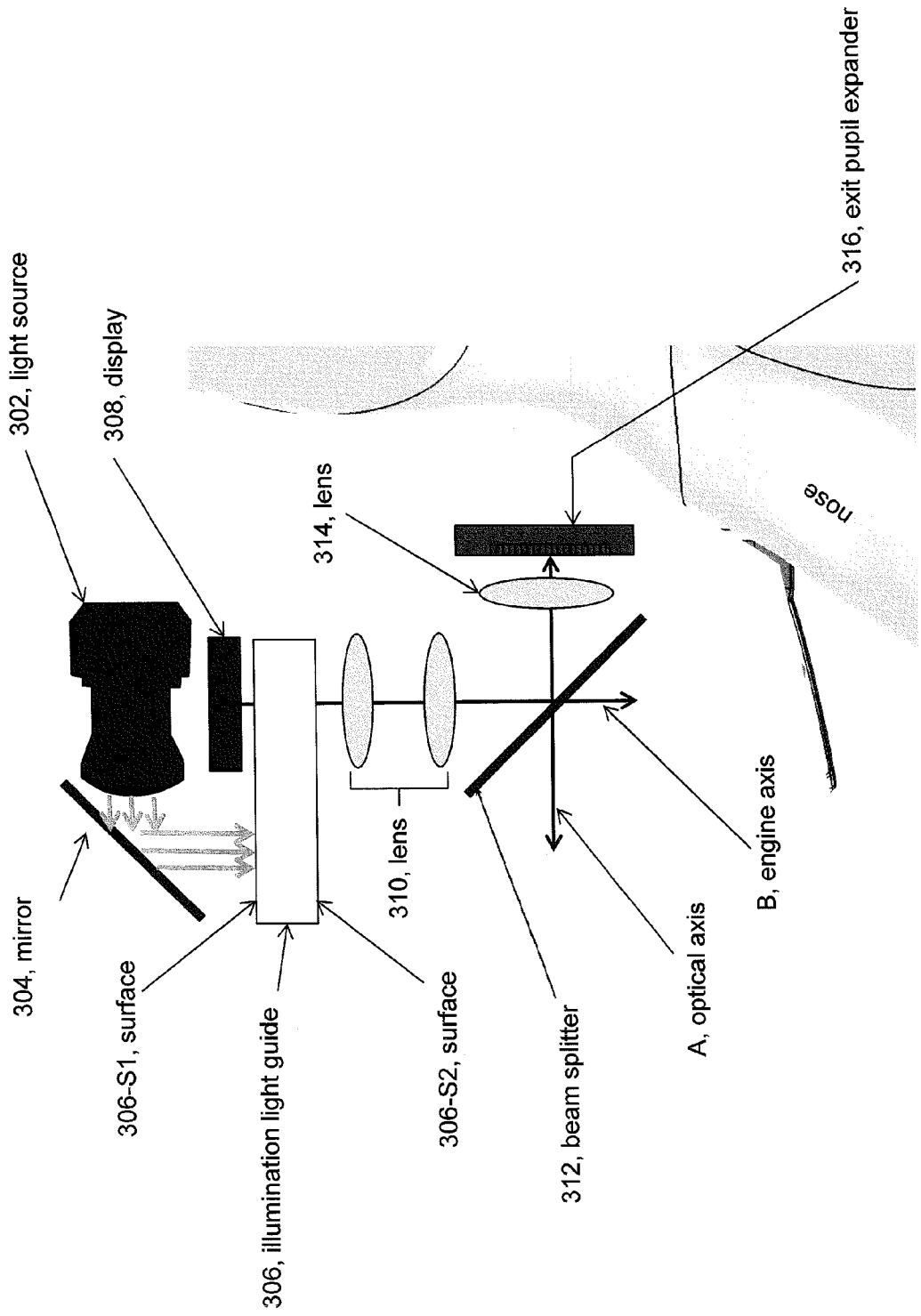

One non-limiting embodiment of such a light guide in an optical engine of a near-eye display device is shown at FIGS. 3A-B, in which FIG. 3A illustrates in shadow the outline of the overall device and FIG. 3B shows the optical engine in isolation with reference numbers. While not to scale, the size is relative with respect to the near eye device of FIGS. 2A-B from which it can be seen the light guide embodiment can be made much thinner. This is because a) the light source itself need not be disposed between the micro display and the lens, and b) the distance between the micro display and the lens can be shortened in the FIG. 3A-B embodiment which additionally means the lens need not be as large as in FIG. 2A-B. Whether the embodiment of FIGS. 3A-B or that of FIG. 7, the illumination source is disposed away from the user's nose, in both cases above the user's optical axis A.

The optical engine of FIG. 3A-B has several components arranged as was detailed for FIGS. 2A-B. Namely, there is along an engine axis B a micro display 308, a first lens arrangement 310 and a beam splitter 312 which redirects light from the engine axis B to the user's optical axis A. Along the optical axis A there is a collimating lens 314 and an exit pupil expander 316 which expands and redirects the beam for viewing by the user, whose nose is labeled at FIG. 3B for reference. The exit pupil expander 316 comprises highly efficient in-coupling and out-coupling gratings.

The light source 302 of FIGS. 3A-B is disposed for convenience above the micro display 308 but there are many different locations it can be effectively located. As illustrated by the three heavy arrows at FIG. 3B, light from the light source 302 is reflected at a mirror 304 toward a first surface 306-S1 (input surface) of a layered light guide 306. In another embodiment the light source 302 is disposed where FIGS. 3A-B show the mirror 304 in which case the mirror is no longer necessary. With additional mirrors the light source 302 can be disposed at other locations still.

The light source 302 is a multi-color source rather than monochromatic. This aids in limiting the overall profile of the optical engine. Such a multi-color light source 302 may be realized by adjacently disposed but different color monochromatic sources such as red, blue and green light emitting diodes mounted on a single substrate, or even a white light source such as a white LED or a halogen (or other filament-type) bulb.

Figure 4:
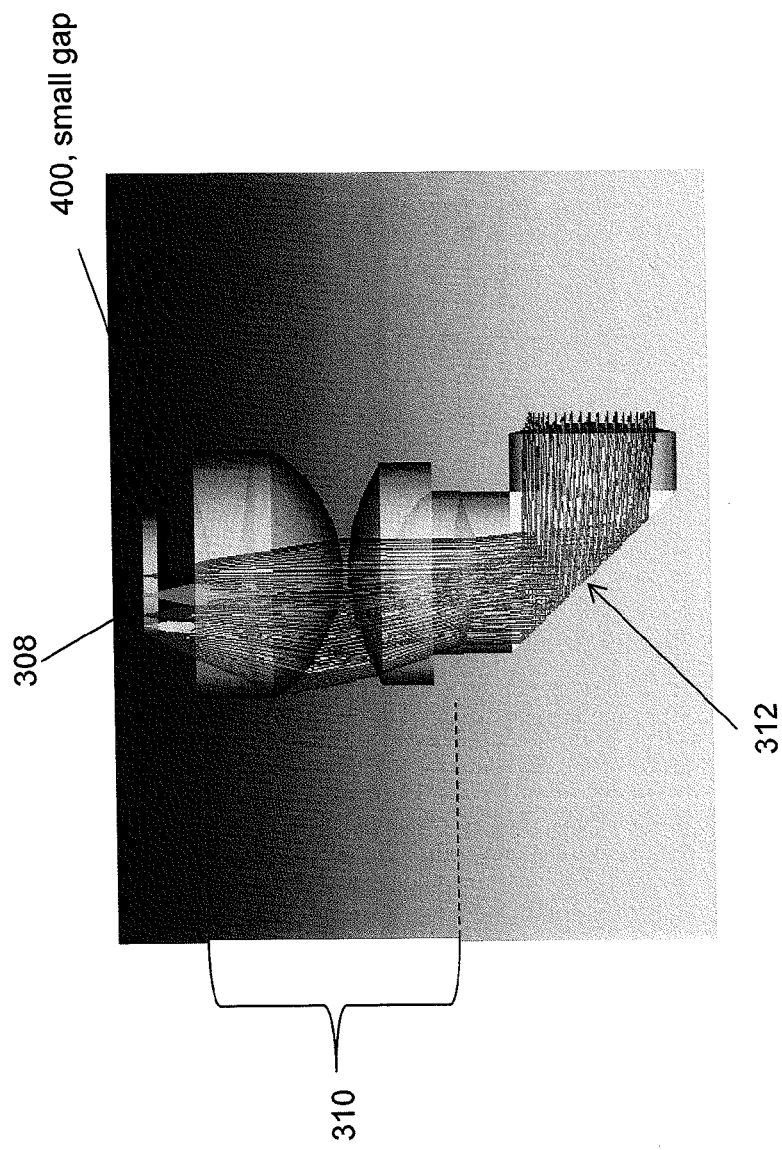
FIG. 4 is a perspective view of the lens arrangement and the micro display from FIGS. 3A-B, with space provided for the light guide according to an exemplary embodiment of these teachings.

The light guide 306 is quite thin and as shown at the perspective view of FIG. 4 only a small gap 400 need be imposed between the micro display 308 and the first lens element of the first lens arrangement 310. For further orientation, the beam splitter 312 described at FIG. 3A-B is shown at the lower portion of FIG. 4.

Figure 5:
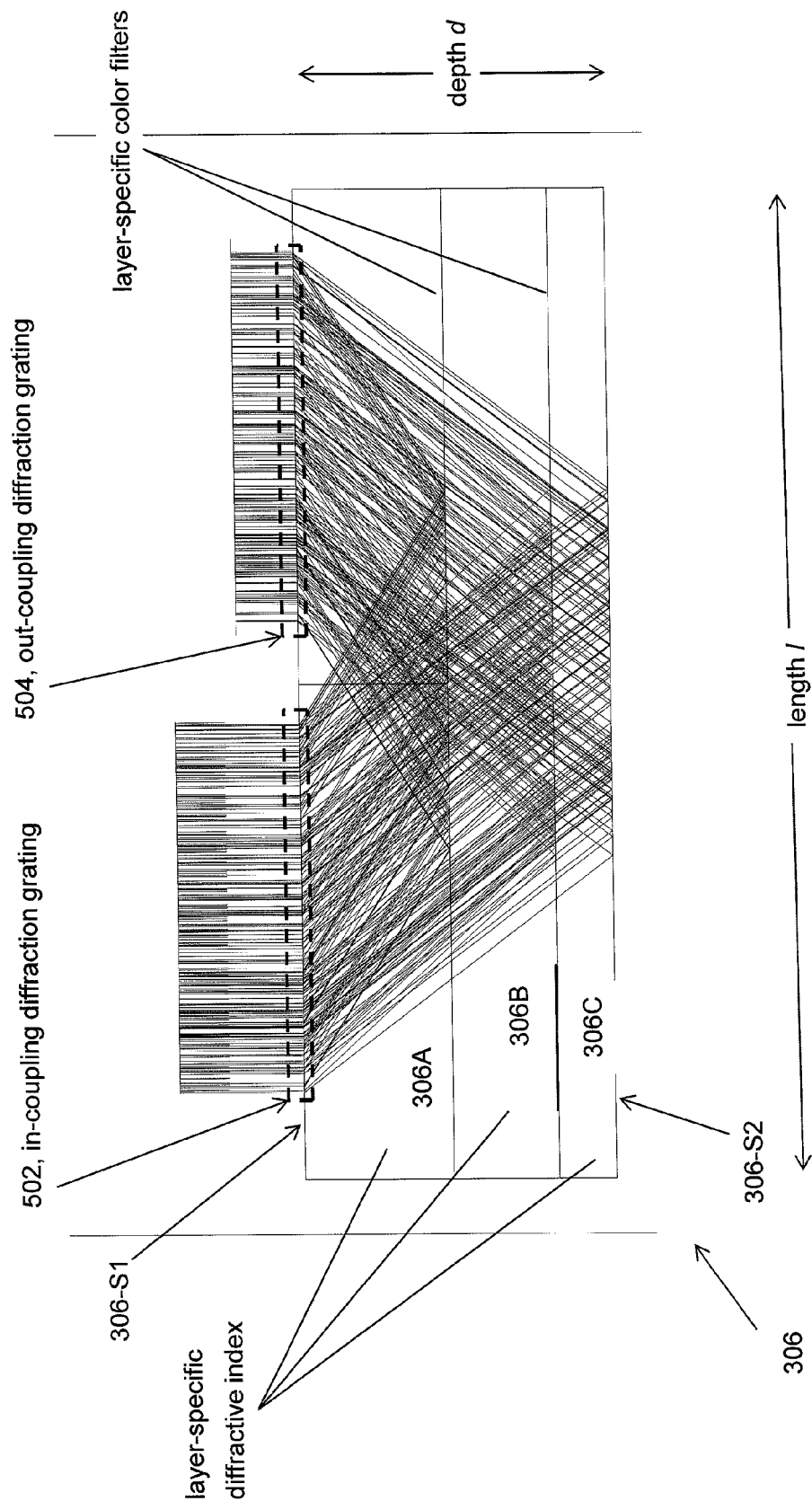
FIGS. 5-6 illustrate ray traces through the color-specific layers of the light guide shown at FIGS. 3A-B according to an exemplary embodiment of these teachings.

FIG. 5 is an expanded sectional view of the layered light guide 306 according to an exemplary embodiment of these teachings, with different color ray traces passing through. In the non-limiting FIG. 5 embodiment there are three layers: layer 306A for red, layer 306B for green and layer 306C for blue. In the FIG. 5 embodiment all of the incident light enters the light guide 306 at the same first surface 306-S1 as was shown at FIG. 3B, though FIG. 7 details an alternative embodiment in which this is not the case. At FIG. 5 the light is entering at the left side of the drawing and exiting at the right side. The layered structure enables the use of a red-green-blue (RGB) light source without the need to increase the footprint of the light guide 306, as compared to the case where the light source is monochrome.

Opposite the first surface 306-S1 is an opposed second surface 306-S2, and each of those surfaces 306-S1, 306-S2 have a length l that is much greater than a depth d of the layered light guide 306. The light guide 306 also has a width w (not shown) into and out of the page as presented at FIG. 5.

In general the width w is also much greater than the depth d and less than the length l, for example on the order of l=2 w in one non-limiting example.

Figure 6:
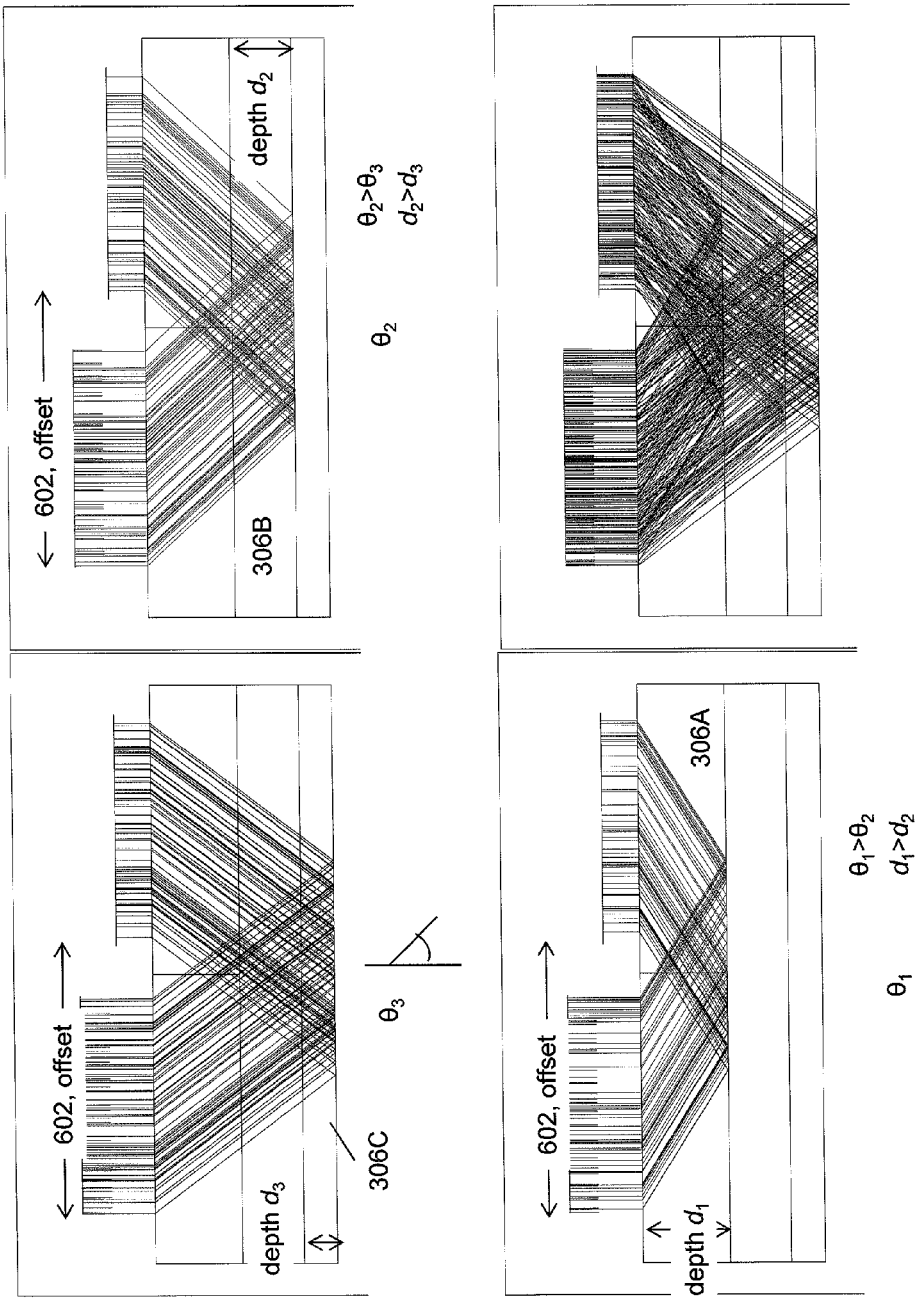
Figure 7:
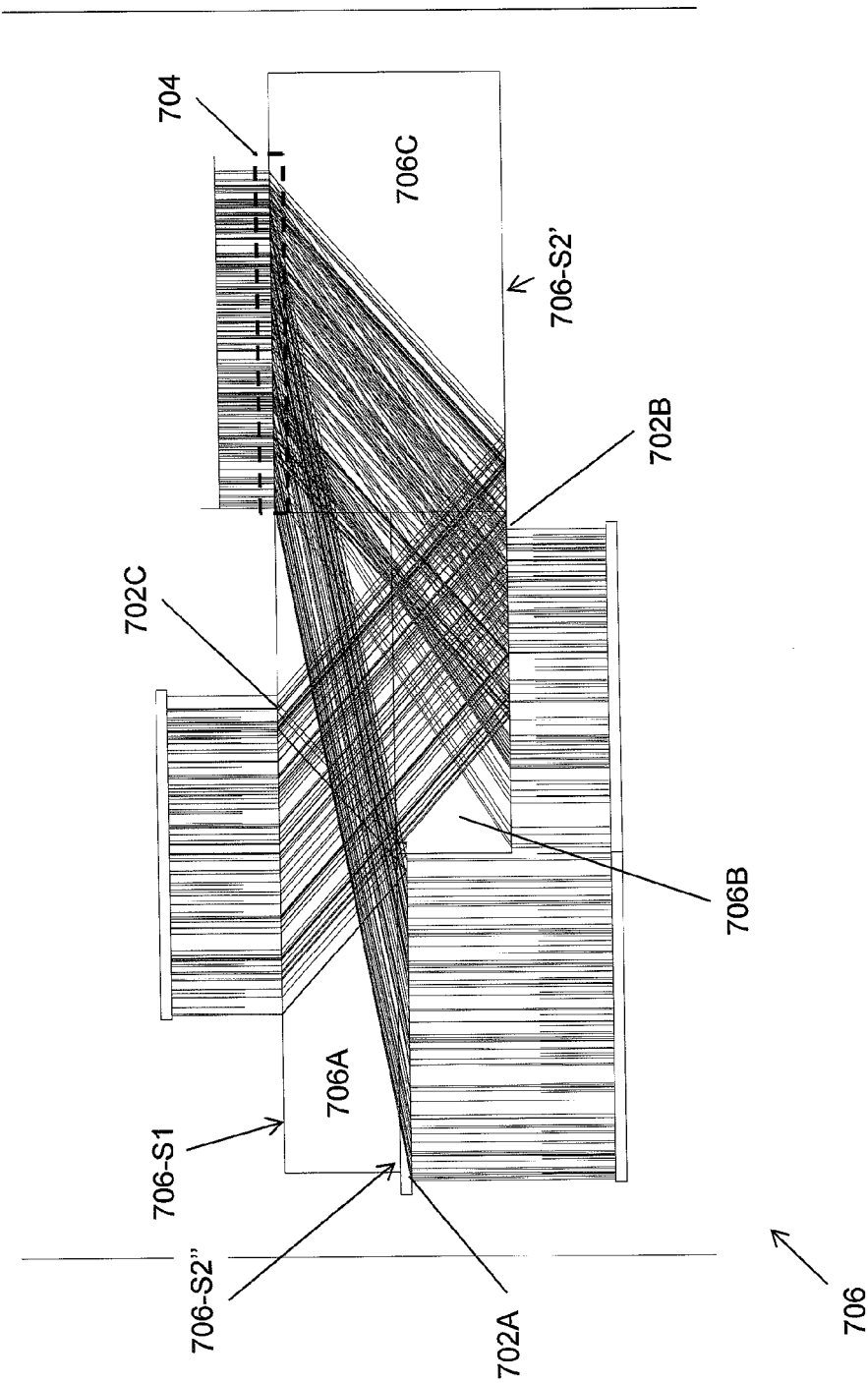
FIG. 7 illustrates ray traces through the color-specific layers of another embodiment of the light guide in which different color light enters at different in-coupling sections according to an exemplary embodiment of these teachings.

While three layers are shown at the light guide 306 embodiments of FIGS. 5-7, there may be a larger number of layers for separating colors, for example N layers where N is an integer at least equal to three.

In one embodiment the layers 306A, 306B, 306C of the light guide are defined by differing refractive indices, each matched to a different wavelength or color. In this manner the refractive indices impose a color selectivity to the different layers as will be detailed below with reference to FIG. 6.

In another embodiment the layers 306A, 306B, 306C of the light guide are defined by differing color filters, each of these filters also matched to a different wavelength or color. For example, assuming layer 306A is to propagate red light along the light guide 306 length/then along the boundary of layers 306A and 306B there is a red filter which allows green and blue wavelengths to pass. Assuming also that layer 306B is to reflect green light along the light guide 306 length l then along the boundary of layers 306B and 306C there is a green filter which allows blue wavelengths to pass. In this layer 306B there is no red light because it has been filtered out at the boundary between layers 306A and 306B. This leaves only blue light to pass into the lowermost layer 306C, which is filtered along the lower boundary of layer 306C which is also the second surface 306-S2 of the light guide 306 and propagates laterally along the length l via reflection in layer 306C. Since the second surface 306-S2 is the lower boundary of the third layer to which is input only blue light in this example, the surface boundary 306-S2 itself acts as a color-specific filter regardless of whether the input color is blue, red or green.

In either of the two embodiments above, wavelength-specific refractive index per layer and wavelength-specific filtering per layer, the different wavelengths of light propagate along the length l in their respective layers and are output at the first surface 306-S1 at a position (exit section 504) that is offset from where the light was incident (input section 502), as shown at FIG. 5. This output light illuminates the micro display 308 shown in FIG. 3B, and the illuminated information on the micro display is then reflected along the engine axis toward the beam splitter 312 as shown at FIG. 4.

In order to achieve a thinness (depth d) in the light guide 306 sufficient for use in such a small host as a head-mounted near field display device, it is important that light incident at the input section 502 undergoes a relatively large refraction angle θ, which is measured from the normal to the input surface (first surface 306-S1 in FIG. 5). Differences in refractive indices alone will impose a certain refraction angle according to Snell's law, which states:

$$\frac{\sin\theta_{input}}{\sin\theta_{output}} = \frac{n_{output}}{n_{input}},$$

where θ is the angle of incidence and n is the refractive index for the input and output propagation mediums. For an incident ray that is normal to the input surface as shown in FIG. 5 there is no refraction because sin (0°)=0. Even if the angle of the mirror 304 in the optical engine arrangement shown at FIG. 3B were adjusted to impose a non-zero angle of incidence between the input beam and the input/first surface 306-S1 of the light guide 306, Snell's law shows that it is unlikely that one would be able to achieve the desired thinness for the wave guide 306 only by layering different propagation mediums having different refractive indices.

To this end the light guide 306 additionally defines optical in-coupling and out-coupling diffraction gratings. These gratings greatly alter the angle of incidence of the input light in order to achieve a much larger component of the light vector propagating along the length l rather than along the depth d, meaning a thinner design for the light guide 306 is possible. The in-coupling diffraction grating 502 and the out-coupling diffraction grating 504 are disposed along the first surface 306-S1 of the light guide 306 as shown by dashed lines in FIG. 5. These dashed lines may also be considered to indicate an input section (502) and an output section (504) of the light guide, since there is total internal reflection of the light at all other portions of the light guide 306. In an embodiment the in-coupling angle is preserved in the light guide 306 due to using the same pitch for the in-coupling grating 502 and the out-coupling grating 504.

FIG. 6 illustrates the same ray tracings through the light guide 306 as was shown at FIG. 5, except the first three panels each isolate one of the three colors and the fourth panel is the combined ray tracings, same as FIG. 5. Continuing the assumptions noted above for FIG. 5 that red light reflects in layer 306A, green light in layer 306B and blue light in layer 306C, FIG. 6 illustrates ray traces of those different layer wavelength-specific reflections.

The first panel at the upper left of FIG. 6 is for blue light. The incident light is normal to the perpendicular of the input/first surface 306-S1 and enters at the in-coupling diffraction grating 502, encounters the in-coupling grating 502 and is refracted at blue refraction angle $\theta_3$, where FIG. 6 illustrates exactly how that refraction angle is defined. The refracted blue light passes through layers 306A and 306B and is reflected at layer 306C which has a depth $d_3$. The reflected blue light then passes through layers 306C, 306B and 306A in order to exit the light guide 306 at the out-coupling diffraction grating 504. The lateral displacement of the blue light along the length l of the light guide 306 is shown at FIG. 6 as an offset 602.

The next panel of FIG. 6 at the upper right illustrates ray traces for green light which also enters at the same in-coupling diffraction grating 502 shown at FIG. 5. This green light is refracted at green refraction angle $\theta_2$, which in the specific embodiment is greater than $\theta_3$ since the green wavelength reflecting layer 306B is not as far from the in-coupling grating 502 as the blue wavelength layer 306C. As illustrated, also the depth $d_2$ of the green reflecting layer 306B is greater than the depth $d_3$ of the blue reflecting layer 306C but this relation depends in part on the respective layer refractive indices and the amount of difference in their relative refraction angles.

The green light is reflected at layer 306B and passes back through layers 306B and 306A to exit the light guide 306 at the out-coupling diffraction grating 504. The lateral displacement of the green light along the length l of the light guide 306 is also the offset 602, same as that of the blue light since the in-coupling and out-coupling diffraction gratings for both are the same. Ray traces for the red light at the third panel (lower left corner) of FIG. 6 is similar, except the red light is refracted with angle $\theta_1$ and is reflected in layer 306A having depth $d_1$ without first passing through any other layers. In the illustrated embodiment the red layer depth $d_1$ is greater than the green layer depth $d_2$, which may change in other embodiments depending on the respective refractive indices. However the red light angle of refraction $\theta_1$ is greater than the green light and blue light angles of refraction $\theta_2$ and $\theta_3$ since the red layer depth $d_1$ is necessarily less than the multi-layer depths $(d_1+d_2)$ or $(d_1+d_2+d_3)$ and so the red light needs a higher refraction angle $\theta_1$ to span the same offset 602. These characteristics of relative refraction angles are relevant to the FIG. 5 embodiment wherein the multi-color incident light is input at the same in-coupling section 502, and also output at the same out-coupling section 504.

For the first implementation detailed above the layers 306A-C are characterized by different refractive indices. This causes the different colors to penetrate to different depths and thus emerge from the light guide 306 at the same location 304 despite having different propagation angles (refraction and reflection angles). In the example of FIGS. 5-6 those different depths are $d_1$; $d_1+d_2$; and $d_1+d_2+d_3$. The refractive indices are chosen to ensure total internal reflection of the red beam at the first interface (border of layers 306A and 306B), for the green beam at the second interface (border of layers 306B and 306C) and for the blue beam at the light guide/air interface (lower surface 306-S2). In a specific implementation of this first embodiment the three color wavelengths are 630 nm, 525 nm and 470 nm; and the refractive indices of their respective layers are 2.0, 1.8, and 1.5. In this specific but non-limiting example the grating pitch is 350 nm.

For the second implementation detailed above in which there are different color-specific filters in the different layers 306A-C, in the described implementation of this embodiment the order of the color filters are red, green and blue so that red is reflected first, then green and then blue which in the example was reflected only at the light guide/air interface (surface 306-S2).

FIG. 7 illustrates an embodiment alternative to that shown at FIGS. 5-6 in that there is no common in-coupling diffraction grating at FIG. 7 for all the different wavelengths of incident light. As will be detailed this can result in an even thinner/flatter implementation of the light guide which is referred to by reference number 706 at FIG. 7. Blue light is incident from the top, through the first surface 706-S1 at in-coupling diffraction grating 702C and reflects at a first instance of the opposed second surface 706-S2' back to the common out-coupling grating 704. Green light is incident from the bottom, through the one portion of the second surface 706-S2' at in-coupling diffraction grating 702B and does not reflect on its path to the common out-coupling grating 704. Red light is incident from the bottom also, but through a second instance of the opposed second surface 706-S2" at in-coupling diffraction grating 702A, and red light also does not reflect on its path to the common out-coupling grating 704.

In this embodiment, there are two layers 706A and 706B which are stacked and the third layer 706C is adjacent to the stacked two layers. This is an even flatter implementation since the maximum depth d of the overall light guide 706 is the combined depths of layers 706A and 706B only.

At least some of the above embodiments enable the following technical advantages when utilized in a near-eye display device for illuminating a micro display 308. Firstly, it allows the light source to be disposed away from the user's nose which avoids alignment problems while simultaneously improving the overall system performance (resolution) due to the better optimization possibilities for the optical design. Secondly, it reduces the total track of the imaging optics and thus the sizes of the lenses, as can be seen in comparing FIGS. 3A-B with FIGS. 2A-B. And thirdly it increases the design flexibility in that the light guide solution presented herein can be implemented with different lengths of waveguides. That is, the length/of the light guide can be made longer to bring the illumination incident on the light guide further away from the engine axis or shorter to bring it closer.

As an overview of some of the points detailed above for the exemplary embodiments, an apparatus according to the non-limiting embodiments comprises a multi-color light source 302; a micro display 308; an optical system 310, 312 for collimating and redirecting light from the micro display to an optical axis A defined by a near-eye display device; and a light guide 306 comprising multiple color-specific layers 306A-C, an in-coupling diffraction grating 502, 702A-C through which light from the multi-color light source enters the light guide and an out-coupling diffraction grating 504, 704 through which light from the light guide exits towards the micro display.

In one specific embodiment each different color-specific layer of the light guide is defined by a different refractive index. In another specific embodiment each different color-specific layer of the light guide is defined by a different color-specific filter.

In other examples the light guide comprises only one in-coupling diffraction grating 502 through which all multi-color light from the light source enters the light guide, and further in that same example the one in-coupling diffraction grating is disposed along a same surface 306-S1 of the light guide as the out-coupling diffraction grating 504.

In another example the multi-color light source comprises red, green and blue light emitting diodes, and is disposed adjacent to the micro display opposite the optical system.

In a still further example detailed above there were three layers which can be stated more generically as N, wherein the multi-color light source outputs N distinct colors and the light guide consists of N stacked color-specific layers, where N is an integer greater than two.

Another example detailed above had the light guide comprising at least a first in-coupling diffraction grating 706A disposed along a first surface 706-S1 of the light guide and at least a second in-coupling diffraction grating 706B, 706C disposed along an opposed second surface 706-S2', 706-S2" of the light guide, in which different colors from the multi-color light source enters the light guide at different ones of the at least one first and second in-coupling diffraction gratings. Further in this example the multi-color light source outputs N distinct colors, and the light guide consists of N-x stacked color-specific layers and x color-specific layers adjacent to the N-x stacked color-specific layers, where N is an integer greater than 2 and x is an integer less than N. As shown at FIG. 7, N is three (layers 706A-B) and x is one (layer 706C).

Placing the optical engine in the context of the whole near-eye display device, which as shown at FIG. 3A comprises a head-mountable eyeglass device, the optical axis A lies along a line of sight of a user of the head-mountable eyeglass device; the optical system stated in the above summary comprises lenses 310 and at least one beam splitter 312; and the multi-color light source 302 and the micro display 308 are disposed above the optical axis A when the head-mountable eyeglass device is in a position as worn by the user.

Various modifications and adaptations to the foregoing exemplary embodiments of this invention may become apparent to those skilled in the relevant arts in view of the foregoing description. While the exemplary embodiments have been described above in the context of the eyeglass-type near-eye display, other implementations include a helmet type device and a headband type device, or even a near-eye display that is not head-mounted but rather brought into lose proximity to a user's eye such as when driving a vehicle or operating some other heavy machinery or controlling precision machinery such as surgical or manufacturing robotics.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus comprising:
   a multi-color light source;
   a micro display;
   an optical system for collimating and redirecting light reflected from the micro display to an optical axis defined by a near-eye display device; and
   a light guide, said light guide conducting light from said multi-color light source to said micro display, said light guide having a plurality of stacked color-specific layers, an in-coupling diffraction grating through which light from the multi-color light source enters the light guide, and an out-coupling diffraction grating through which light from the light guide exits towards the micro display.

2. The apparatus according to claim 1, wherein each different color-specific layer of the light guide is defined by a different refractive index.

3. The apparatus according to claim 1, wherein each different color-specific layer of the light guide is defined by a different color-specific filter.

4. The apparatus according to claim 1, wherein the light guide has only one in-coupling diffraction grating through which all multi-color light from the light source enters the light guide.

5. The apparatus according to claim 4, wherein the one in-coupling diffraction grating is disposed along a same surface of the light guide as the out-coupling diffraction grating.

6. The apparatus according to claim 1, wherein the multi-color light source comprises red, green and blue light emitting diodes, and is disposed adjacent to the micro display opposite the optical system.

7. The apparatus according to claim 1, wherein the multi-color light source outputs N distinct colors and the light guide has N stacked color-specific layers, where N is an integer greater than two.

8. The apparatus according to claim 1, wherein the light guide has at least a first in-coupling diffraction grating disposed along a first surface of the light guide and at least a second in-coupling diffraction grating disposed along an opposed second surface of the light guide, in which different colors from the multi-color light source enter the light guide at different ones of the at least one first and second in-coupling diffraction gratings.

9. The apparatus according to claim 8, wherein the multi-color light source outputs N distinct colors, and the light guide has N-x stacked color-specific layers and x color-specific layers adjacent to the N-x stacked color-specific layers, where N is an integer greater than 2 and x is an integer less than N.

10. The apparatus according to claim 1, wherein:
    the near-eye display device comprises a head-mountable eyeglass device;
    the optical axis lies along a line of sight of a user of the head-mountable eyeglass device;
    the optical system comprises lenses and at least one beam splitter; and
    the multi-color light source and the micro display are disposed above the optical axis when the head-mountable eyeglass device is in a position as worn by the user.

11. A method comprising:
    providing a multi-color light source, a micro display, and an optical system for collimating and redirecting light reflected from the micro display to an optical axis defined by a near-eye display device; and
    illuminating the micro display with the multi-color light source via a light guide, said light guide conducting light from said multi-color light source to said micro display, said light guide having a plurality of stacked color-specific layers, an in-coupling diffraction grating through which light from the multi-color light source enters the light guide, and an out-coupling diffraction grating through which light from the light guide exits towards the micro display.

12. The method according to claim 11, wherein each different color-specific layer of the light guide is defined by a different refractive index.

13. The method according to claim 11, wherein each different color-specific layer of the light guide is defined by a different color-specific filter.

14. The method according to claim 11, wherein the light guide has only one in-coupling diffraction grating through which all multi-color light from the light source enters the light guide.

15. The method according to claim 14, wherein the one in-coupling diffraction grating is disposed along a same surface of the light guide as the out-coupling diffraction grating.

16. The method according to claim 11, wherein the multi-color light source comprises red, green and blue light emitting diodes, and is disposed adjacent to the micro display opposite the optical system.

17. The method according to claim 11, wherein the multi-color light source outputs N distinct colors and the light guide has N stacked color-specific layers, where N is an integer greater than two.

18. The method according to claim 11, wherein the light guide has at least a first in-coupling diffraction grating disposed along a first surface of the light guide and at least a second in-coupling diffraction grating disposed along an opposed second surface of the light guide, and
    wherein illuminating the micro display with the multi-color light source via the light guide comprises directing different colors from the multi-color light source into the light guide at different ones of the at least one first and second in-coupling diffraction gratings.

19. The method according to claim 18, wherein the multi-color light source outputs N distinct colors, and the light guide has N-x stacked color-specific layers and x color-specific layers adjacent to the N-x stacked color-specific layers, where N is an integer greater than 2 and x is an integer less than N.

20. The method according to claim 11, wherein:
    the near-eye display device comprises a head-mountable eyeglass device;
    the optical axis lies along a line of sight of a user of the head-mountable eyeglass device;
    the optical system comprises lenses and at least one beam splitter; and
    the multi-color light source and the micro display are disposed above the optical axis when the head-mountable eyeglass device is in a position as worn by the user.

* * * * *